United States Patent [19]
Scott et al.

[11] Patent Number: 4,892,504
[45] Date of Patent: Jan. 9, 1990

[54] STRAW CHOPPER AND SPREADER ASSEMBLY

[75] Inventors: William A. Scott; Bernard Penner, both of Winnipeg, Canada

[73] Assignee: Gehl Company, West Bend, Wis.

[21] Appl. No.: 174,786

[22] Filed: Mar. 29, 1988

Related U.S. Application Data

[63] Continuation of Ser. No. 747,447, Jun. 21, 1985, Pat. No. 4,735,216, which is a continuation of Ser. No. 404,611, Aug. 2, 1982, Pat. No. 4,526,180.

[51] Int. Cl.$^4$ ............................................. A01F 29/02
[52] U.S. Cl. ................................... 460/112; 460/111; 239/666; 239/682
[58] Field of Search ............... 56/192, 503, 14.6; 130/27 R, 27 B, 27 T; 241/101.7, 222, 239, 186.3, 186 R; 239/655, 679

[56] References Cited

U.S. PATENT DOCUMENTS

| | | | |
|---|---|---|---|
| 3,931,859 | 1/1976 | van der Lely | 56/503 |
| 4,292,795 | 10/1981 | Linn | 56/503 |
| 4,383,536 | 5/1983 | Delorme | 130/27 R |
| 4,591,102 | 5/1986 | Clarke | 239/655 |

FOREIGN PATENT DOCUMENTS 2315222  6/1975  France ................................. 56/503

Primary Examiner—John Weiss
Attorney, Agent, or Firm—Larson and Taylor

[57] ABSTRACT

A straw chopper and spreader assembly for receiving straw from a threshing machine, has a casing enclosing a pair of contra-rotatable flail assemblies. The flails are mounted in different horizontal planes and have blades which overlap so as to shear and chop the straw. At the rear of the casing is a rear outlet defined between a rear skirt and a bottom extension of the casing. The rear skirt is adjustble so as to enlarge or reduce the size of the rear outlet. In addition to discharge through the rear outlet, chopped straw is also discharged laterally through side chutes which have removable end portions so that discharge selectively may be outwardly and upwardly or outwardly and downwardly. Chaff spreading discs are mounted below the assembly and rotates horizontally. These receive chaff from the threshing combine via a reciprocating feed tray secured to and extending rearwardly from the reciprocal sieves and extend rearwardly from the sieve thereby depositing chaff onto the discs to be spread outwardly with chopped straw. A beater assembly rotates just above and behind the discharge of the straw walker which, together with a deflector panel, forces the straw downwardly into the flail assemblies.

1 Claim, 4 Drawing Sheets

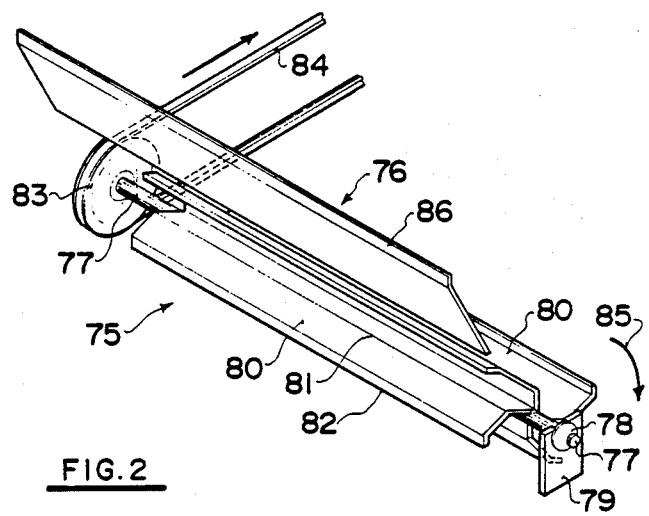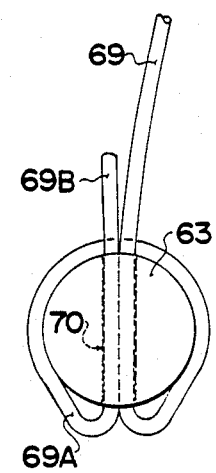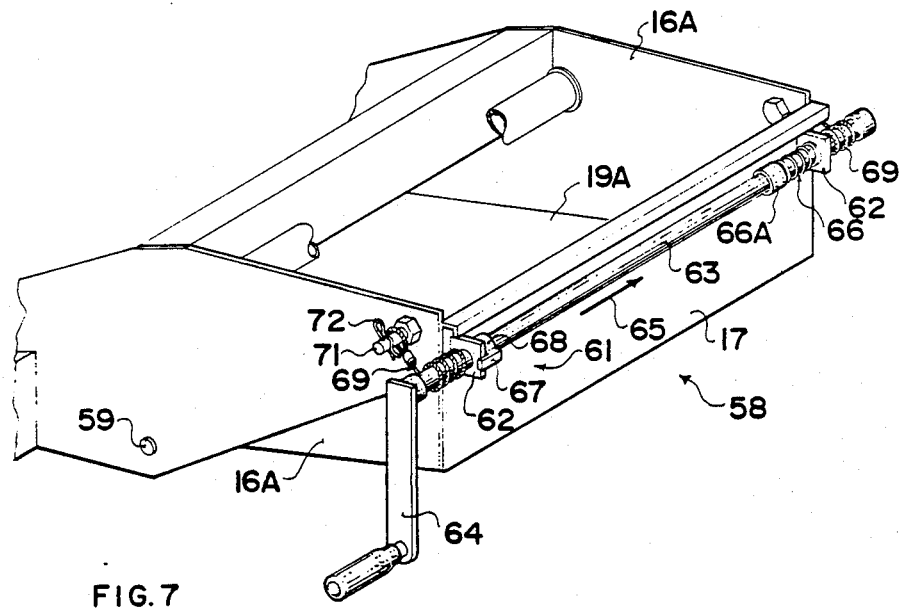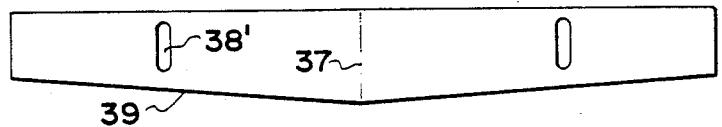

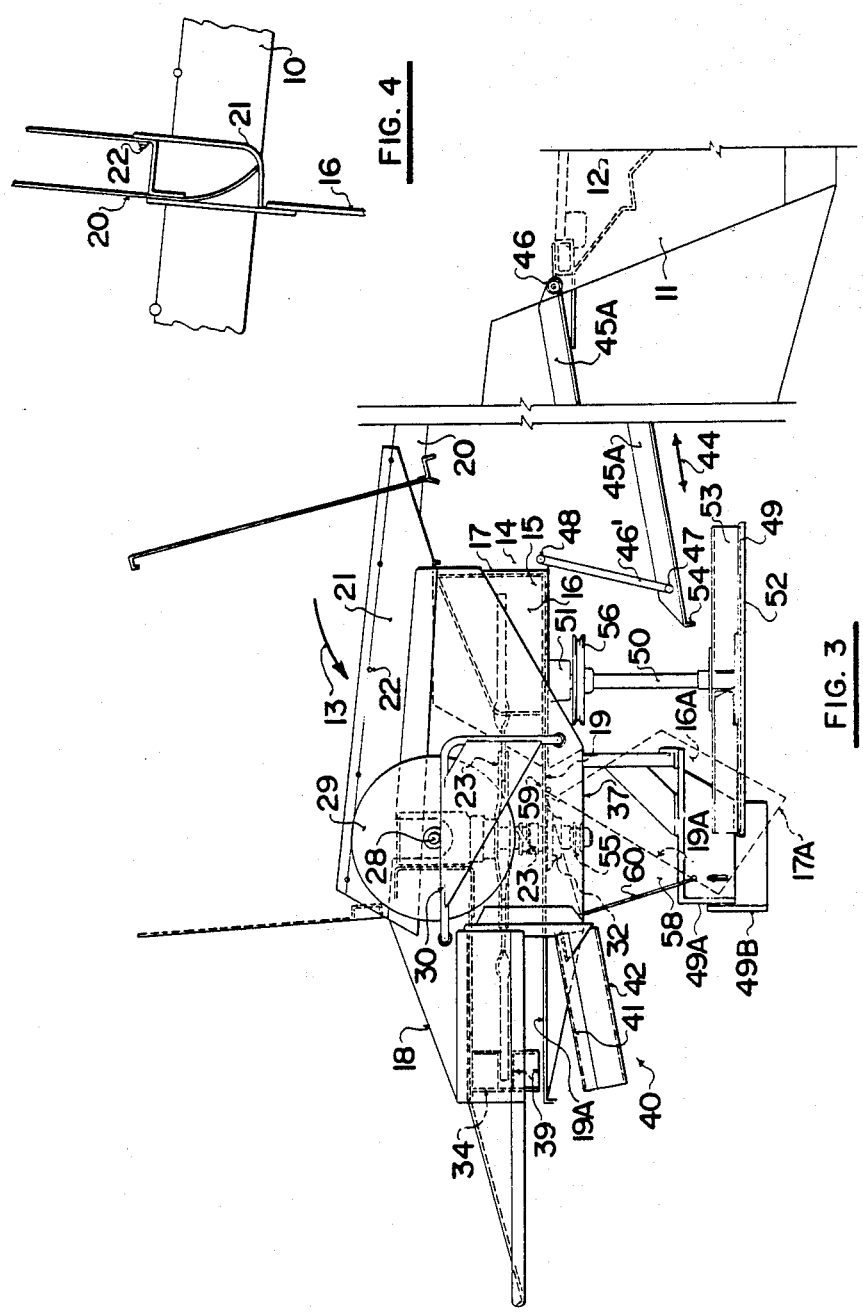

STRAW CHOPPER AND SPREADER ASSEMBLY

This application is a continuation of application Ser. No. 747,447 filed June 21st, 1985, now issued as U.S. Pat. No. 4,735,216, which is a continuation of application Ser. No. 404,611 filed Aug. 2, 1982 and now issued as U.S. Pat. No. 4,526,180.

BACKGROUND OF THE INVENTION

This invention relates to new and useful improvements in straw choppers and spreaders including means to collect and spread chaff, and is adapted to be secured under the rear, substantially horizontal, discharge area of a threshing machine such as a combine or the like.

An efficient chopper and spreader device should satisfy several criteria. Firstly, of course, it should chop the straw received from the straw walkers, readily and easily and distribute same behind and to the sides of the machine with little chance of jamming or clogging occurring. In other words the choppers or flails should chop and distribute the straw in such a way that encountering a temporarily heavy stand will not cause the straw to back up in the discharge area.

Secondly, it is preferably that it should also collect and distribute the chaff rather than just dump it in the swath immediately behind the discharge.

It is also desirable that some control be provided for controlling the area of distribution of the chopped straw both rearwardly and sideways.

A further desirable feature is the provision of means whereby, if desired, the straw chopper can be made inoperative and adjusted readily so that the straw can be dumped from the discharge of the combine into a windrow immediately therebehind in the usual manner without the straw being chopped.

Conventional straw chopping devices merely receive the straw is which is then chopped and spread with little control being provided. An example is shown in U.S. Pat. No. 4,292,795.

The present device overcomes disadvantages inherent with conventional straw chopping and spreading devices and satisfies the above enumerated requirements in a satisfactory manner.

In accordance with the invention there is provided a straw chopper and spreader assembly for connection to the rear discharge area of a threshing machine such as a combine or the like, said threshing machine including reciprocating straw walker assemblies feeding straw to said discharge area and a reciprocating chaff conveying tray situated spaced below said straw walder and also communicating with said discharge area to receive straw therefrom, a pair of contra-rotating flail assemblies in said casing receiving straw and chopping same, said fails rotating in different horizontal planes whereby the blades thereof overlap one another to provide straw shearing action therebetween, an adjustable skirt at the rear of said casing to control discharge of chopped straw therebehind and adjustable chutes extending one upon each side of said skirt to control the ejection of and direction of straw to the sides of said skirt.

In accordance with another aspect of the invention there is provided a straw chopper and spreader assembly for connection to the rear discharge area of a threshing machine including means for feeding straw to the discharge area, the said assembly comprising a casing, first and second flail means in the casing for receiving straw and for chopping same, the first flail means being rotatable relative to the section flail means, and the first and second flail means including blades which lie in different horizontal planes and overlap one another to provide a straw shearing action therebetween on rotation of the first flail means, means for discharging chopped straw laterally of the casing and adjustable means for controlling the discharge of the chopped straw to the rear of the assembly casing.

Another advantage of the invention is that it is designed to be secured by mounting brackets, to the discharge area of varying makes of harvester combine machines.

A yet further advantage of the invention is to provide a device of the character herewithin described which, if desired, can readily be inactivated so that the straw and chaff can be deposited from the discharge area of the combine harvester, in a swath, in the usual manner.

Another advantage of the present invention is to provide a device of the character herewithin described which is simple in construction, economical in operation and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 2 is an isometric view of the beater assembly per se.

FIG. 3 is a side elevation of FIG. 1 but with the beater assembly removed.

FIG. 4 is a fragmentary end elevation showing one method of attachment of the straw chopper and spreader to the side of the discharge area of a harvester combine.

FIG. 7 is an isometric view of part of the straw chopper assembly showing the winch assembly for the front pan.

FIG. 8 is an enlarged fragmentary end view of the winch spindle showing one method of attaching the dead end of the cable.

FIG. 9 is a front elevation of the skirt per se situated at the rear end of the assembly.

In the drawings like characters of reference indicate corresponding parts in the different figures.

DETAILED DESCRIPTION

Figure 1:
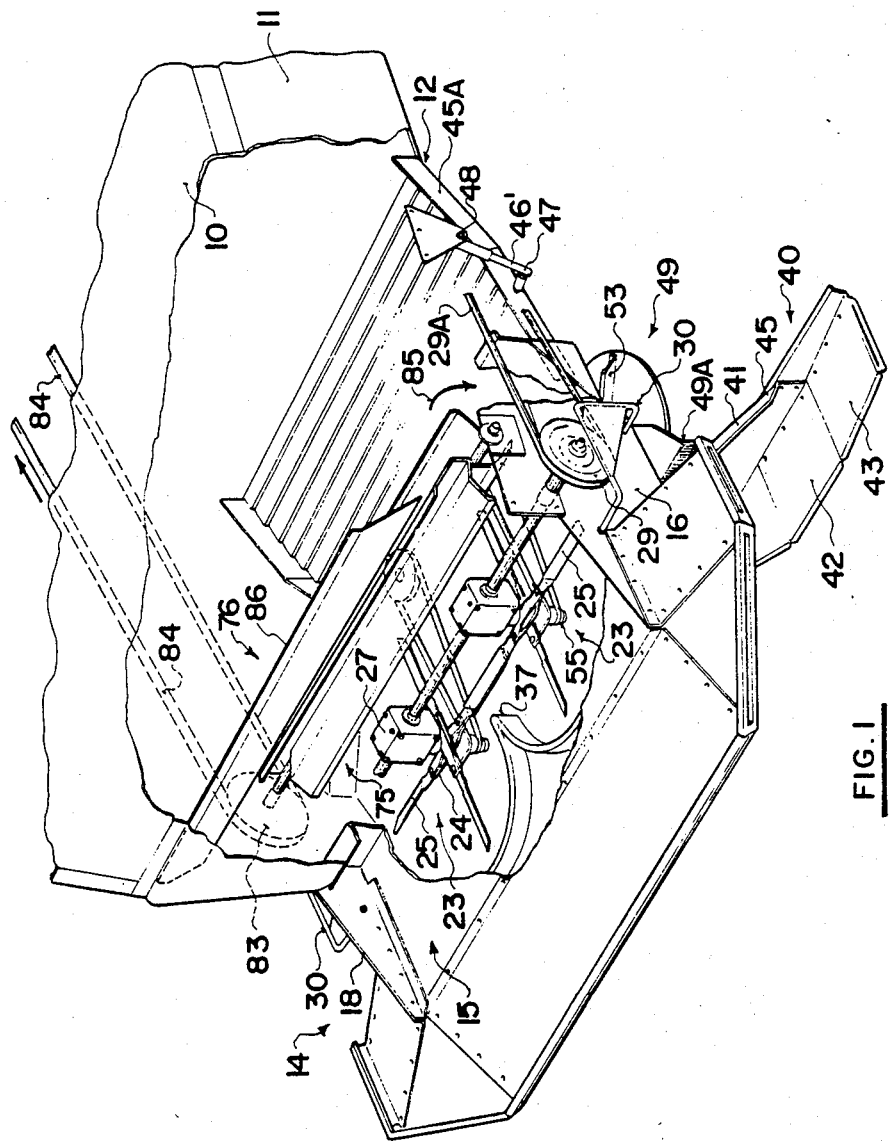
FIG. 1 is an isometric view, partially broken away, of the straw chopper secured to the rear end of a harvester combine.

Proceeding therefore to describe the invention in detail, reference should first be made to FIGS. 1 and 3 in which 10 illustrates the lower side of the discharge are at the rear of the combine, the side of which is indicated by reference character 11. Within the side 11, is shown the rear end of the conventional sieve component 12 above which is situated the conventional straw walker (not illustrated) which deposits the straw over and downwardly in the direction of arrow 13, into the straw chopper and spreader assembly collectively designated 14 and which is secured adjacent the rear of the discharge area of the combine.

The assembly 14 is enclosed within a casing collectively designated 15 including side plates 16, front plate 17, a rear casing area 18 and base 19 forming a boxing secured to the side plates 20 of the discharge area by means of brackets 21 secured by bolts 22 and having a configuration similar to that shown in FIG. 4. This attachment construction may vary depending upon the combine to which it is attached.

Figure 5:
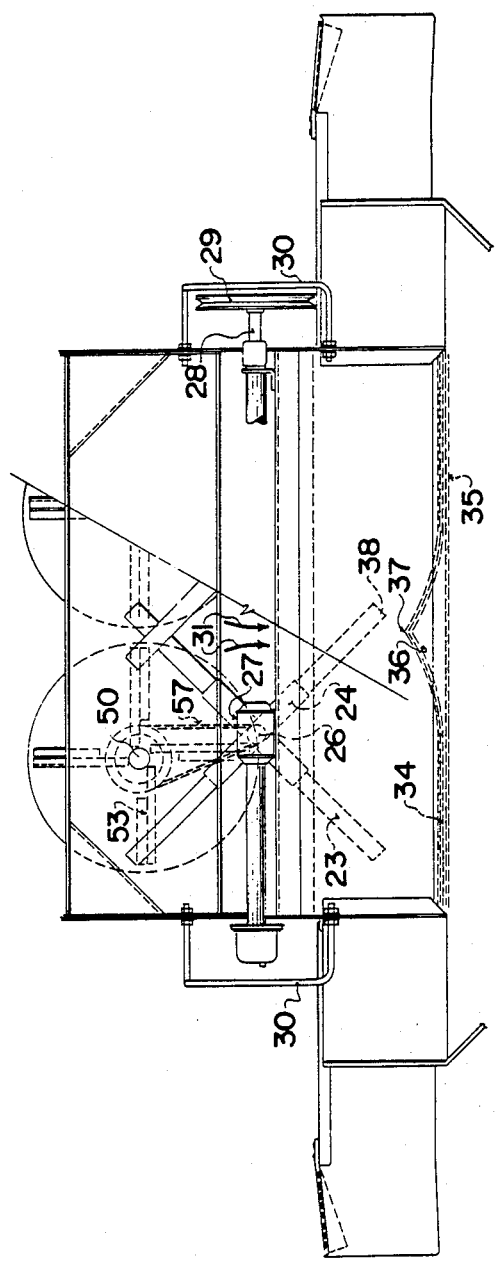
FIG. 5 is a top plan view of FIG. 1, partially broken away, and with the beater assembly removed for clarity.

FIGS. 1 and 5 show a pair of flail assemblies 23 in side by side relationship each consisting of four blade assemblies 24 having pivotal flails 25 secured to and extending radially therefrom and mounted upon vertical spindles 26 extending downwardly from gear boxes 27 which in turn are driven by cross shaft 28 from pulley 29 and connected to a source of power from the combine (not illustrated) via belt 29A (see FIG. 1).

The outer ends of the cross shaft 28 are enclosed within guard and lifting handle assemblies 30 as clearly illustrated in FIGS. 3 and 5.

The gear boxes ensure that the flail assemblies rotate in the direction of arrows 31 thus ensuring that all straw dumped downwardly through the open upper side of the spreader and chopper casing 15, passes through the areas between the overlapping flails, the ends of which overlap as clearly shown. In this connection, the horizontal planes of rotation of the two flails are slightly misaligned so that there is no chance of interception one by the other yet at the time the overlapping relationship is such that a shearing action is provided thus giving a good chopping action to the straw passing downwardly through the flails. The lower ends of the spindles 26 are supported within bearings 32 within the lower wall 19 of the casing (see FIG. 3).

Figure 6:
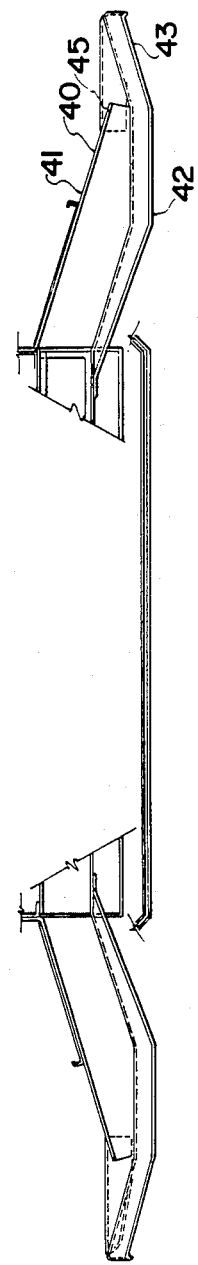
FIG. 6 is a fragmentary rear elevation substantially along the line 6—6 of FIG. 5.

A vertically situated adjustable skirt 34 is situated at the rear of the casing, said skirt having horizontal outer portions 35 and inwardly and forwardly curved portions 36 which terminate in a common apex 37 when viewed in plan as shown in FIG. 5 and the curvature of the portions 36 is similar to the swept curvature path of the tips 38 of the flail assemblies as shown in dottled line in FIG. 5 and these tips just clear this curved area once again ensuring that the straw is caught by the flails prior to being expelled outwardly after chopping. The skirt is adjustable vertically through means such as vertical slots 381 shown in FIG. 9 and bolts (not illustrated) passing therethrough securing the skirt to the rear of the casing and it will be observed that the lower edges 39 of the skirt inclines upwardly and outwardly from the aforementioned apex 37. Reference to FIG. 3 will show that this skirt is adjustable so that the lower edges thereof are adjustable from a position shown in phantom in FIG. 3 to a position shown in full line thus varying the distance from the lower edge 39 and an extension 19A of the base of the casing. This, together with the sloping configuration of the edges 39, controls the volume of chopped straw being spread rearwardly and the volume of the remainder of the straw which is ejected sideways through the two side chutes collectively designated 40. Theses chutes 40 (shown in rear elevation in FIG. 6) include downwardly and outwardly extending upper plates or walls 41, lower plates 42 which extend downwardly, then horizontally and then upwardly as shown at 43, with this outer portion 43 inclining upwardly beyond the outer edge 45 of the upper wall 41 thus directing the chopped straw being discharged therethrough, upwardly and outwardly to each side of the combine. The bottom or lower wall 42 can be removed, if so desired, so that the chopped straw being ejected is directed outwardly and downwardly by the upper wall 41 and thus terminates closer to the sides of the combine so that the vertical positioning of the skirt together with the use of the lower wall 42 of the chutes give considerable control to the distribution of the chopped straw depending upon the desires of the operator, together with the density of the straw passing through the combine.

The sieves 12 reciprocate in the direction of double headed arrow 44 (see FIG. 3) and a transversely corrugated chaff conveying tray 45A is pivotally secured by the upper end thereof across the rear end of the sieves by means of pivot 46. This tray, which spans the discharge area, inclines rearwardly and downwardly and is supported at the lower end thereof by means of a pivoted hanger bracket 46' at each side thereof pivoted by the lower end to the lower end of the tray by means of pivot pins 47 and by the upper end thereof to the rear 14 of the casing 10, by means of pivot pins 48.

A pair of chaff spreading discs collectively designated 49 are detachably secured to the lower ends of spindles 50 supported in bearings 51 and extending downwardly below the casing 14 and just forwardly of the flails 23. These discs include a disc-like face 52 and vertically situated spreader bars or blades 53 extending radially from the center thereof and the lower end 54 of the tray 45, dumps the chaff onto the discs just forwardly of the spindles 50. A pulley 55 is provided on the lower end of the shafts 26 and a corresponding pulley 56, of a slightly larger diameter, is secured to the shafts 50 in horizontal alignment with pulleys 55 and a V-belt shown schematically by reference character 57 (see FIG. 5) extends around these pulleys and supplies rotational drive to the spreader disc assemblies 49 so that the chaff is distributed by these discs as it is dumped from the reciprocating tray 45A, onto the upper surfaces of the discs.

Adjustable shrouds or deflectors 49B may be situated rearwardly of these discs by means of brackets 49A supported from the casing 15. These angle rearwardly from the center and assist in deflecting the chaff outwardly.

Occasionally, it may be desirable to lay the swath of straw (together with the chaff) in the conventional manner without chopping same so that it may be picked up and used for other purposes, same being picked up by conventional means at a later time.

Under these circumstances, the drive to the flails is disconnected, the chaff spreading discs are removed from the spindles 50 and the lower front side portion or pan of the casing shown in phantom and indicated by reference character 58, is unhitched from the main casing 14 and is hinged rearwardly around pivot point 59 to take up the position shown in phantom and to be detachably held in this position by means of a detachable link 60. The hinged portion or pan includes the base 19A, side portions 16A, and front wall portions 17A. This allows the straw to be dumped straight through the casing 15 and onto the ground without being chopped by the flails.

While this hinging of the pan 58 may be undertaken manually, FIGS. 7 and 8 show the preferred embodiment which includes a winch assembly collectively designated 61.

The front pan portion 58, is hinged around the pivot point 59 hereinbefore described and the winch assembly 61 is secured to the front wall 17A of the pan portion 58, being mounted upon a pair of brackets 62 which extend forwardly from the front wall 17A adjacent the other side thereof. These brackets are apertured and receive a winch shaft 63 and support same for rotation. However it will be noted that this shaft, together with a handle 64 on one end thereof, may be end shifted in the direction of arrow 65 and against pressure of a spring 66 surrounding the shaft and reacting between one bracket 62 and an adjustable spring tension collar 66A secured to the shaft. A winch stop 67 extends from a boss or collar 68 secured to the shaft adjacent the other bracket 62 and normally engages the front of the bracket and prevents rotation of the shaft by means of handle 64 as clearly shown in FIG. 7.

However when it is desired to rotate the shaft 63 by means of the handle 64, the shaft is moved in the direction of arrow 65 against pressure of spring 66 thus clearing the stop 67 from the brackets 62 and permitting rotation of the shaft. When the shaft is released, the spring 66 returns the shaft to the position shown in FIG. 7 so that the stop 67 engages the bracket 62.

A winch cable 69 engages around the portions of the shaft outboard of brackets 62 and this cable is secured by the dead or inner end thereof to the shaft. FIG. 8 shows one method of such securement in which the tail end or dead end portion engages through an aperture 70 drilled diametrically through the shaft, wraps around the shaft as indicated by reference character 69A and then passes upwardly through the shaft through the aperture 70 terminating in the end portion 69B. This anchors the cable to the shaft.

The cable is wound around the end portions of the shaft as clearly shown and the free end 69C is provided with a loop (not illustrated) which is detachably securable over a pin 71 extending upon each side of the side walls 16 of the fixed portion of the casing and adjacent the upper front corners thereof as clearly shown in FIG. 7. Hairpin clips 72 detachably engaged within the ends of pins 71 to retain the loops on the pins and to permit removal of these loops as will hereinafter be described.

When in the position shown in FIG. 7, the pan portion 58 is normally held in this position by nut and bolt assemblies 73 which pass through the sides 16 of the fixed portion and through the sides 16A of the pan portion.

However when it is desired to move the pan portion from the position shown in FIG. 7 to the rearwardly hinged position, shown part way in phantom in FIG. 3, then these nut and bolt assemblies 73 are removed. The winch shaft 63 is end shifted in the direction of arrow 65 thus disengaging the catch or latch 67 from the adjacent bracket 62. The winch shaft is then rotated by means of handle 64 against the weight of the pan portion 58 thus unwinding the cables which support the front of the pan through the winch shaft. The weight of the pan moves it to the substantially vertical position (not illustrated in these drawings) whereupon the looped ends of the cable portions 69C are removed from the pins 71 and reattached to similar pins 74 (see FIG. 3) extending upon each side of the rear of the fixed portion of the casing. Once again the shaft is end shifted to disengage the latch 67 and rotation of the shaft continues by means of handle 64 thus winding the cables upon the shaft and swinging the pan portion 58 rearwardly clear of the discharge area.

To reconvert the assembly, the procedure is reversed bringing the pan up to the position shown in FIG. 7 whererupon bolts 73 are reinserted and of course the drive reconnected to the flail assemblies together with the chaff spreading discs.

Reference to FIGS. 1 and 2 show a beater assembly collectively designated 75 which assists in urging the straw from the discharge area, into the flail assemblies in conjunction with a deflector collectively designated 76.

The beater assembly is situated transversely across the discharge area below the discharge of the straw walkers and above the entrance to the casing above the front portions of the flail assemblies. It consists of a shaft 77 supported within bearings 78 which in turn are supported in brackets 79 secured to or forming part of the brackets 21 attaching the assembly to the discharge area.

A plurality of transversely situated, beater blades 80 extend radially from the shaft 77 and these blades or bats are angulated transversely as indicated by reference character 81 with the trailing edges 82 being angulated for stiffness.

A pulley 83 is secured to one end of shaft 77 and V belt 84 extends around this pulley and forwardly to the spreader drive (not illustrated) on the harvester or combine.

The beater assembly is designed to rotate in the direction of arrow 85 as indicated in FIG. 2, the deflector panel 76 extends transversely across the discharge area and is adapted to be bolted to the rear panel of the rear combine hood defining the upper wall of the discharge area. In this connection, an angulated upper edge 86 is apertured to recive the bolts (not illustrated) so that the deflector inclines downwardly and forwardly just clear of the beater blades and directs the straw downwardly to the beater blades whereupon it is forced into the flail assemblies. It should be understood that the majority of the straw passes directly under the beater assembly to the flail assemblies and the deflector deflects any of the discharging straw which is not first caught by the beater assembly.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. An assembly for spreading straw discharged from a rear discharge area of a combine harvester of the type that moves forwardly across the field to be harvested, the apparatus comprising a casing having a base plate, means for mounting the casing adjacent to the rear discharge area such that the base plate lies in a substantially horizontal plane, a pair of rotatable blade means, means mounting each of said blade means on said casing for rotation about a respective one of two vertical axes spaced transversely of the plate such that the blade means overlap between said axes and are rotated in opposed direction so as to sweep straw material deposited on said plate in a direction rearwardly across a line joining the axes and outwardly from said plate, said casing including a substantially vertical wall arranged such that it extends across said plate transversely to the direction of movement of the combine at a location rearwardly of said blade means and cooperates with said plate and said blade means to discharge the material outwardly to the sides of the combine, said blade means each having a plurality of separate blade members each consisting of a single flat blade extending outwardly from the respective vertical axis with all the blade members of the associated one of the blade means lying in a common place, said mounting means being arranged such that the single flat blades of one blade means overlap and pass vertically above the single flat blades of the other blade means in an area between the axes and such that the blades pass said line joining the axes from the forward side thereof to a rearward side thereof in phase, a shearing action in the area of the blades being provided solely by the coaction between the blades without any intervening stationary shearing surfaces, said casing mounting means being arranged such that straw from said discharge area enters the area between said blade means forwardly of said line and is discharged from said area rearwardly of said line, guide means for directing the discharge of chopped straw from said blade means rearwardly and to each side of said assemby, and means for generating a spreading force on said straw consisting solely of said blade means and said vertical wall.

* * * * *